US009014001B2

United States Patent
Hong et al.

(10) Patent No.: US 9,014,001 B2
(45) Date of Patent: Apr. 21, 2015

(54) TRANSMISSION NODE AND RECEPTION NODE IN CONTENT CENTRIC NETWORK, AND COMMUNICATION METHOD OF TRANSMISSION NODE AND RECEPTION NODE

(75) Inventors: Seong Ik Hong, Suwon-si (KR);
Byoung Joon Lee, Seongnam-si (KR);
Myeong Wuk Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 13/494,245

(22) Filed: Jun. 12, 2012

(65) Prior Publication Data

US 2012/0314580 A1    Dec. 13, 2012

(30) Foreign Application Priority Data

Jun. 13, 2011 (KR) .................. 10-2011-0056744

(51) Int. Cl.
*H04L 29/08* (2006.01)
(52) U.S. Cl.
CPC .................................. *H04L 67/327* (2013.01)
(58) Field of Classification Search
CPC .................................................... H04L 67/327
USPC .................................... 370/236; 709/229, 219
See application file for complete search history.

(56) References Cited

U.S. PATENT DOCUMENTS

| | | | | |
|---|---|---|---|---|
| 2009/0100011 | A1* | 4/2009 | Lee et al. | 707/3 |
| 2009/0204688 | A1* | 8/2009 | Britton et al. | 709/219 |
| 2009/0287835 | A1* | 11/2009 | Jacobson | 709/229 |
| 2010/0195655 | A1 | 8/2010 | Jacobson et al. | |
| 2012/0166806 | A1* | 6/2012 | Zhang et al. | 713/176 |
| 2012/0215747 | A1* | 8/2012 | Wang | 707/690 |
| 2012/0317307 | A1* | 12/2012 | Ravindran et al. | 709/238 |
| 2013/0041982 | A1* | 2/2013 | Shi et al. | 709/217 |
| 2014/0181140 | A1* | 6/2014 | Kim et al. | 707/769 |

FOREIGN PATENT DOCUMENTS

| | | | |
|---|---|---|---|
| JP | 2009-277234 A | 11/2009 | |
| JP | 2009-278624 A | 11/2009 | |

* cited by examiner

*Primary Examiner* — Albert T Chou
(74) *Attorney, Agent, or Firm* — NSIP Law

(57) ABSTRACT

A method and apparatus for controlling operation of a reception node in a content centric network (CCN) and for content included in the reception node using an operation identifier (OID) are provided. The OID may designate at least one control operation to be performed by the reception node.

19 Claims, 6 Drawing Sheets

TRANSMISSION NODE AND RECEPTION NODE IN CONTENT CENTRIC NETWORK, AND COMMUNICATION METHOD OF TRANSMISSION NODE AND RECEPTION NODE

CROSS-REFERENCE TO RELATED APPLICATION(S)

This application claims the benefit under 35 U.S.C. §119(a) of Korean Patent Application No. 10-2011-0056744, filed on Jun. 13, 2011, in the Korean Intellectual Property Office, the entire disclosure of which is incorporated herein by reference for all purposes.

BACKGROUND

1. Field

The following description relates to a transmission node and a reception node in a content centric network (CCN), and a communication method of the transmission node and the reception node.

2. Description of Related Art

An Internet protocol (IP) is generally used as a network layer protocol on the Internet. A network layer may search for a route, such that data may arrive at a destination node via several network nodes or routers. The IP may store an address of a destination in each IP packet. Thus, each router may construct a routing table so that each packet may arrive at a destination with reference to addresses stored in the IP packet. A router, in response to receiving a packet, may forward the packet to another network node, with respect to the contents of the routing table. Accordingly, the packet may arrive at the destination.

Certain issues may arise in the network layer protocol based on a destination address, due to rapid spread of the Internet. For example, traffic congestion may occur due to a large number of users concentrating on one or more nodes having popular content. Thus, a content centric network (CCN) may be used. Each node included in the CCN may perform numerous functions in contrast to the IP, for example, by a control method used by each node or a method of controlling content included in each node in the CCN.

SUMMARY

In one general aspect, there is provided a communication method of a transmission node in a content centric network (CCN), the method including generating a content request packet including an operation identifier (OID) that designates at least one control operation to be performed by at least one reception node included in the CCN, and transmitting the content request packet to the at least one reception node, wherein the OID of the content request packet controls an operation of the at least one reception node using the OID.

The method may further include defining the OID to correspond to the at least one control operation to be performed by the at least one reception node receiving the content request packet.

The defining may include defining the OID corresponding to each of the at least one control operation to be performed with respect to content stored in the at least one reception node receiving the content request packet.

The generating may include adding an OID field including the OID to a header of the content request packet.

The OID may designate at least one operation selected from the group of storing content, deleting content, copying content, updating content, forwarding content, dividing content, merging content, encoding content, decoding content, encrypting content, and any combination thereof.

In another general aspect, there is provided a communication method of a reception node in a CCN, the method including receiving a content request packet including an OID that designates at least one control operation to be performed by at least one reception node included in the CCN, verifying the at least one control operation corresponding to the OID, and performing the at least one control operation.

The content request packet may further include a name of a content requested by a transmission node included in the CCN, and the performing the at least one control operation may include determining whether the reception node includes the content, according to the name of the content, and performing the at least one control operation for the content based on whether the content is included in the reception node.

The method may further include generating a content delivery packet including an OID that designates at least one control operation to be performed by at least one transmission node included in the CCN.

The OID may designate at least one operation selected from the group of storing content, deleting content, copying content, updating content, forwarding content, dividing content, merging content, encoding content, decoding content, changing a content name, encrypting content, and any combination thereof.

A non-transitory computer-readable medium may include a program for instructing a computer to perform any of the above methods.

In still another general aspect, there is provided a transmission node in a CCN, the transmission node including a generator to generate a content request packet including an OID that designates at least one control operation to be performed by at least one reception node included in the CCN, and a transmitter to transmit the content request packet to the at least one reception node, wherein the OID of the content request packet controls an operation of the at least one reception node using the OID.

The transmission node may further include a defining unit to define the OID to correspond to the at least one control operation to be performed by the at least one reception node receiving the content request packet.

The defining unit may define the OID corresponding to each of the at least one control operation to be performed with respect to content stored in the at least one reception node receiving the content request packet.

The generator may include a field adding unit to add an OID field including the OID to a header of the content request packet.

The OID may designate at least one operation selected from the group of storing content, deleting content, copying content, updating content, forwarding content, dividing content, merging content, encoding content, decoding content, encrypting content, and any combination thereof.

In yet another general aspect, there is provided a reception node in a CCN, the reception node including a receiver to receive a content request packet including an OID that designates at least one control operation to be performed by at least one reception node included in the CCN, a verifier to verify the at least one control operation corresponding to the OID, and a performing unit to perform the at least one control operation.

The content request packet may further include a name of a content requested by a transmission node included in the CCN, and the performing unit may include a determining unit to verify whether the reception node includes the content according to the name of the content, and a performing unit to perform the at least one control operation for the content based on whether the content is included in the reception node.

The reception node may further include a generator to generate a content delivery packet including an OID that designates at least one control operation to be performed by at least one transmission node included in the CCN.

The OID may designate at least one operation selected from the group of storing content, deleting content, copying content, updating content, forwarding content, dividing content, merging content, encoding content, decoding content, changing a content name, encrypting content, and any combination thereof.

Other features and aspects will be apparent from the following detailed description, the drawings, and the claims.

Figure 1:
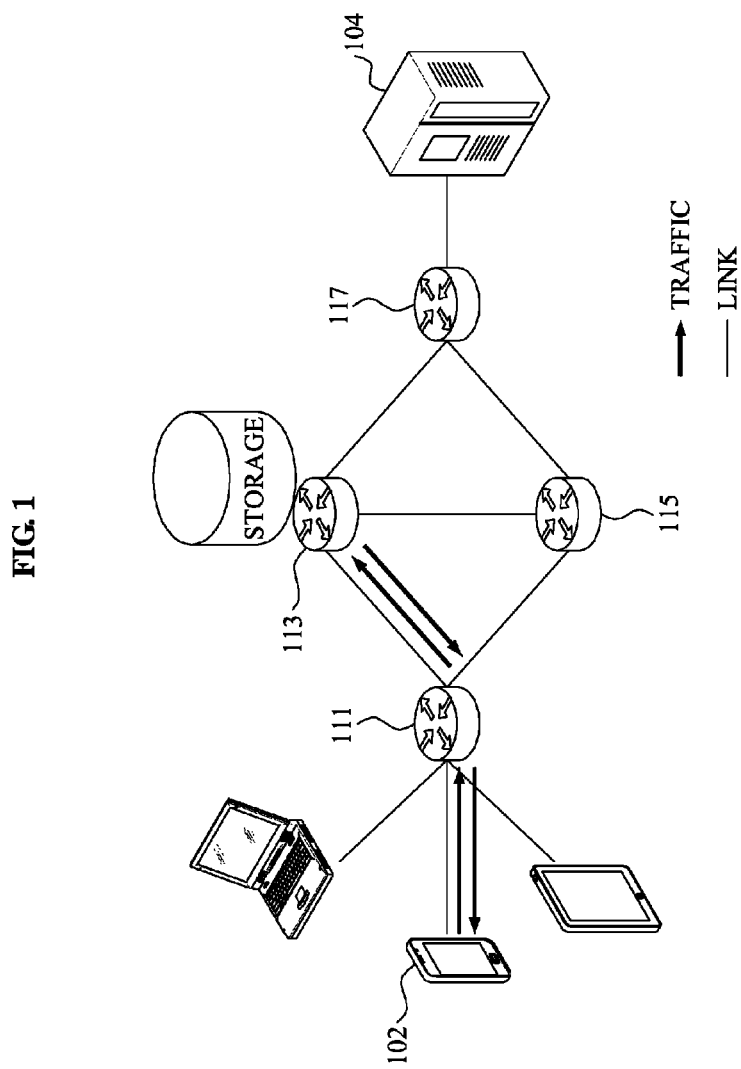
FIG. 1 is a diagram illustrating an example of an operation of a content centric network (CCN).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of an operation of a content centric network (CCN).

The CCN may store, in a header of a packet, a content name used for representing an address of a user terminal 102 and an address of a content server 104. Here, the user terminal 102 may correspond to a source, and the content server 104 may correspond to a destination. Each of routers 111, 113, 115, and 117 may construct a routing table to send each packet to a location corresponding to a content, with reference to the content name recorded in the packet header.

In this instance, each of the network equipments, including the routers 111, 113, 115, and 117 in the CCN, may include a storage that may store content.

A packet in the CCN may be classified into a content request packet (interest packet) and a content delivery packet (data packet). The content request packet may include a content name requested by a node that transmits the content request packet, and the content delivery packet may include the requested content, the content name, and the like.

Thus, in response to receiving of the content request packet, each node may search a storage of each node using a content name included in a header of the content request packet. When a receiving node contains the corresponding content, the receiving node may deliver the corresponding content to a node requesting the corresponding content.

In an Internet protocol (IP) based network, a content requested by the user terminal 102 may be received from an original supplier of the content, that is, the content server 104. However, in the CCN, any intermediate node storing the corresponding content in a storage may reply to the content request and thus, length of an average transmission path may be reduced, which provides a reduction in overall network use.

An operation of performing a request and a response for content in the CCN is described herein. In this instance, both the router 113 and the content server 104 may include a content requested by the user terminal 102.

When the user terminal 102 transmits a content request packet for the content, the router 111 may forward the content request packet to the router 113, since the router 111 may not contain the content.

The router 113 receiving the content request packet may search a storage of the router 113 for the content requested by the user terminal 102.

When the storage of the router 113 includes the content, the router 113 may not forward the content request packet to the router 117, the router 115, and the like. The router 113 may transmit the requested content to the router 111 in a form of a content delivery packet. Accordingly, the router 111 may deliver the transmitted content to the user terminal 102.

In this instance, each of network equipments included in the CCN, such as the user terminal 102, the routers 111, 113, 115, and 117, the content server 104, and the like, may correspond to each node.

Figure 2:
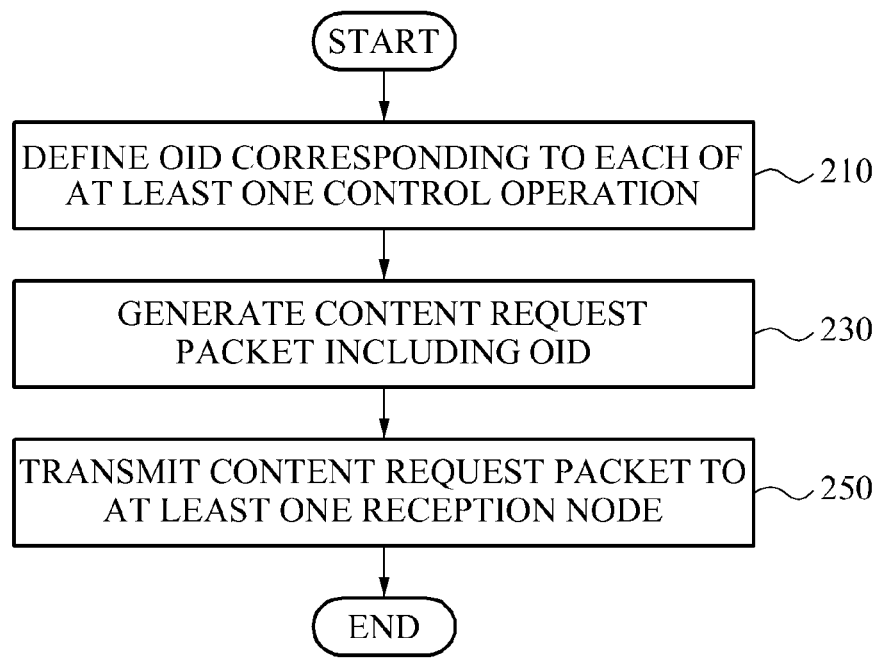
FIG. 2 is a flowchart illustrating an example of a communication method of a transmission node in a CCN.

FIG. 2 illustrates an example of a communication method of a transmission node in a CCN.

In operation 210, the transmission node may define an operation identifier (OID) corresponding to at least one control operation to be performed by at least one reception node receiving a content request packet.

In operation 210, the transmission node may define the OID corresponding to each of the at least one control operation to be performed with respect to content stored in the at least one reception node receiving the content request packet.

Here, the OID may designate at least one operation, for example, storing content, deleting content, copying content, updating content, forwarding content, dividing content, merging content, encoding content, decoding content, encrypting content, and the like.

In operation 230, the transmission node may generate the content request packet, including the OID. In operation 230, the transmission node may generate the content request packet by adding an OID field, including the OID, to a header of the content request packet.

In operation 250, the transmission node may transmit the content request packet to the at least one reception node included in the CCN. Accordingly, operation of the at least one reception node using the OID may be controlled.

Figure 3:
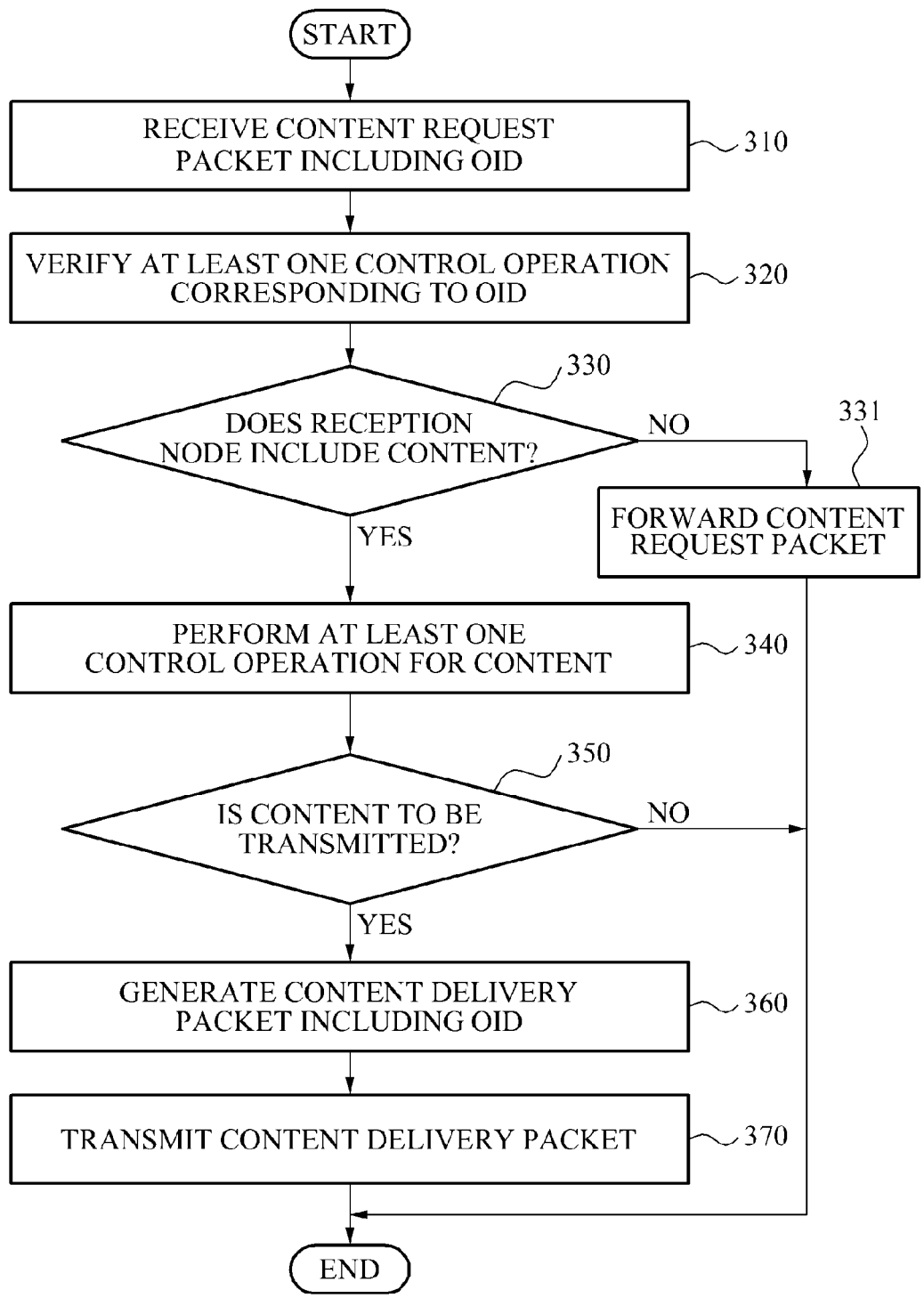
FIG. 3 is a flowchart illustrating an example of a communication method of a reception node in a CCN.

FIG. 3 illustrates an example of a communication method of a reception node in a CCN.

In operation 310, the reception node may receive a content request packet including an OID. Here, the OID may designate at least one control operation to be performed by at least one reception node included in the CCN.

The reception node may verify the at least one control operation corresponding to the OID in operation 320. The reception node may verify whether the reception node includes or stores, in a storage of the reception node, a content requested by a transmission node in operation 330. As an example, the reception node may verify whether the content included in the storage corresponds to the content requested by the transmission node according to a content name in a header of the content request packet.

If the content requested by the transmission node is included in the storage of the reception node as a result of verification in operation 330, the reception node may perform the at least one control operation for the content in operation 340. If the content requested by the transmission node is not included in the storage of the reception node as a result of verification in operation 330, the reception node may not perform the at least one control operation, and forward the content request packet to another node in operation 331.

Here, the OID may designate at least one operation, for example, storing content, deleting content, copying content, updating content, forwarding content, dividing content, merging content, encoding content, decoding content, changing a content name, encrypting content, and the like.

As an example, when a control operation corresponding to the OID is an instruction to forward content, the reception node may deliver the content to the transmission node in operation 340. When the control operation is performed, the reception node may determine whether content is to be transmitted in operation 350.

When a control operation corresponds to forwarding content, or a similar operation that entails transmitting content, as a result of determination in operation 350, the reception node may generate a content delivery packet including the OID in operation 360, and may transmit the content delivery packet to the transmission node in operation 370. The OID included in the content delivery packet may designate at least one operation to be performed by at least one transmission node included in the CCN.

Thus, when a control operation corresponding to the OID included in the content delivery packet is an instruction to store content, the transmission node receiving the content delivery packet may store, in a storage of the transmission node, content included in the content delivery packet.

When a control operation corresponding to the OID is an instruction to update content, the reception node may compare a version of content stored in the storage of the reception node and a version of content requested to be updated, and store the content corresponding to, for example, a later version of the content.

When the at least one control operation is associated with content included in the reception node in operation 320, the reception node may further perform an operation of verifying whether content requested by the transmission node is included in the storage of the reception node.

When the content requested by the transmission node is included in the storage of the reception node, the reception node may perform the at least one control operation for the content. Operations such as deleting content, updating content, changing content, merging content, and the like may be designated as the at least one control operation using content included in the reception node.

When the at least one control operation does not apply to content included in the reception node in operation 320, the reception node may continue to operation 350.

When the at least one control operation does not entail transmitting content as a result of determination in operation 350, the reception node may not generate the content delivery packet, and end operation.

Figure 4:
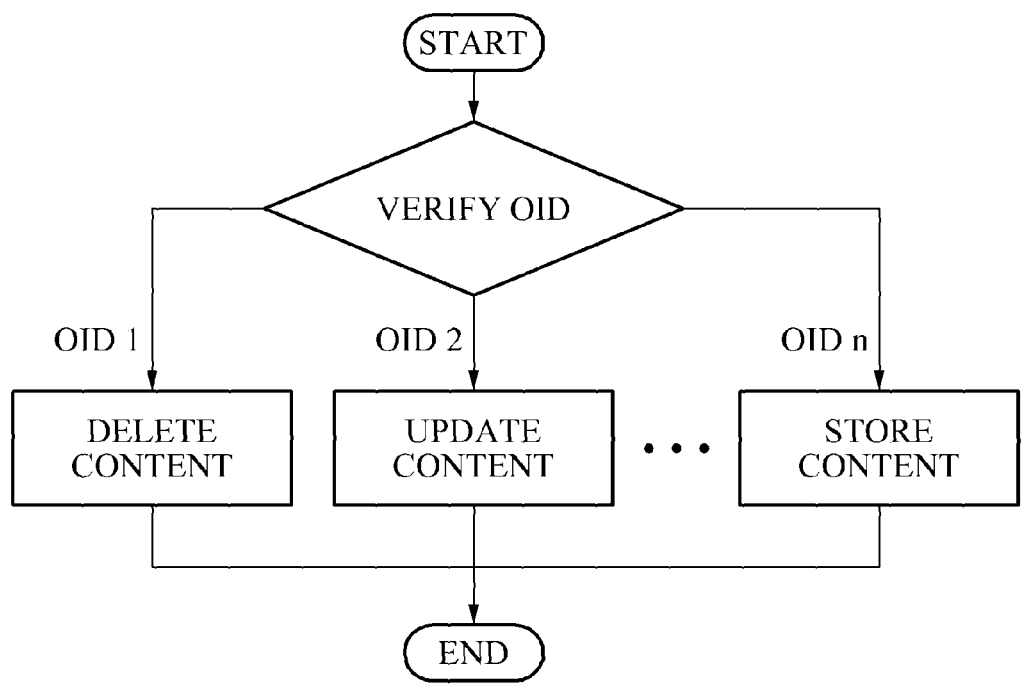
FIG. 4 is a diagram illustrating an example of a method of performing, by a reception node, at least one control operation that corresponds to an operation identifier (OID).

FIG. 4 illustrates an example of a method of performing, by a reception node, at least one control operation that corresponds to an OID.

When the reception node receives a content request packet in a CCN, the reception node may perform various operations corresponding to an OID included in the content request packet.

For example, when the OID corresponds to "1", the reception node may verify a control operation corresponding to OID 1. As a further example, if the control operation corresponding to OID 1 is an instruction to delete content as a result of verification, the reception node may perform a control operation of deleting content included in a storage of the reception node. In this instance, prior to deleting the content, the reception node may perform an operation of verifying whether the content request packet is transmitted by a user having a right to delete the content.

If the OID corresponds to "n", the reception node may verify a control operation corresponding to OID n. For example, if a control operation corresponding to OID n is an instruction to store content, the reception node may store, in a storage space of the reception node, content corresponding to a content name included in the content request packet.

As another example, a transmission node may perform at least one control operation corresponding to an OID included in a content delivery packet in a similar scheme to the method performed by a reception node described in the foregoing.

Thus, in the CCN, the reception node (or the transmission node) may perform various operations. For example, the various operations may include managing or controlling content stored in a storage of each node based on the OID included in the content request packet (or the content delivery packet).

Further, the OID may be used to perform a control operation for each user (or node) when sensitive information, such as personal information or the like, is included in content that is constructed and distributed by a predetermined user, and the content is to be deleted. The OID may also be used to perform a control operation for each user (or node) when a certain content requested by a large number of users (or nodes) is frequently updated, when updated information for a certain content significantly affects users (or nodes), or when a certain content is to be urgently changed.

The OID may be used to perform a control operation for each node when a large number of users (or nodes) are to cache content while responding to a request from a user with regard to policy or technology.

Various forms of control information may be included in a header of a content request packet to be transmitted. Accordingly, control may be performed for content stored in each node in the CCN.

Figure 5:
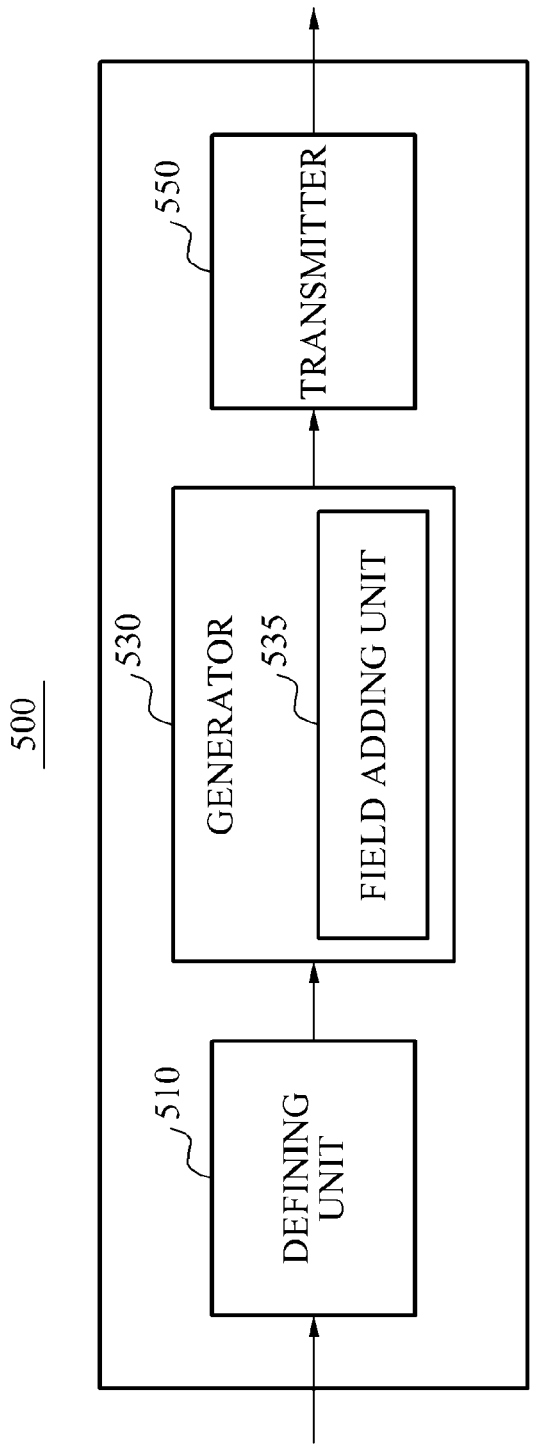
FIG. 5 is a block diagram illustrating an example of a transmission node in a CCN.

FIG. 5 illustrates an example of a transmission node 500 in a CCN.

The transmission node 500 may include a generator 530 and a transmitter 550. The transmission node 500 may further include a defining unit 510.

The defining unit 510 may define an OID corresponding to at least one control operation to be performed by at least one reception node receiving a content request packet.

The defining unit 510 may define an OID corresponding to each of the at least one control operation to be performed for content stored in the at least one reception node receiving the content request packet.

The OID may designate at least one operation, for example, storing content, deleting content, copying content, updating content, forwarding content, dividing content, merging content, encoding content, decoding content, encrypting content, and the like.

The generator 530 may generate a content request packet including an OID that designates at least one control operation to be performed by at least one reception node. The generator 530 may include a field adding unit 535 to add an OID field including the OID to a header of the content request packet.

The transmitter 550 may transmit the content request packet to the at least one reception node included in the CCN. Accordingly, operation of the at least one reception node using the OID may be controlled.

Figure 6:
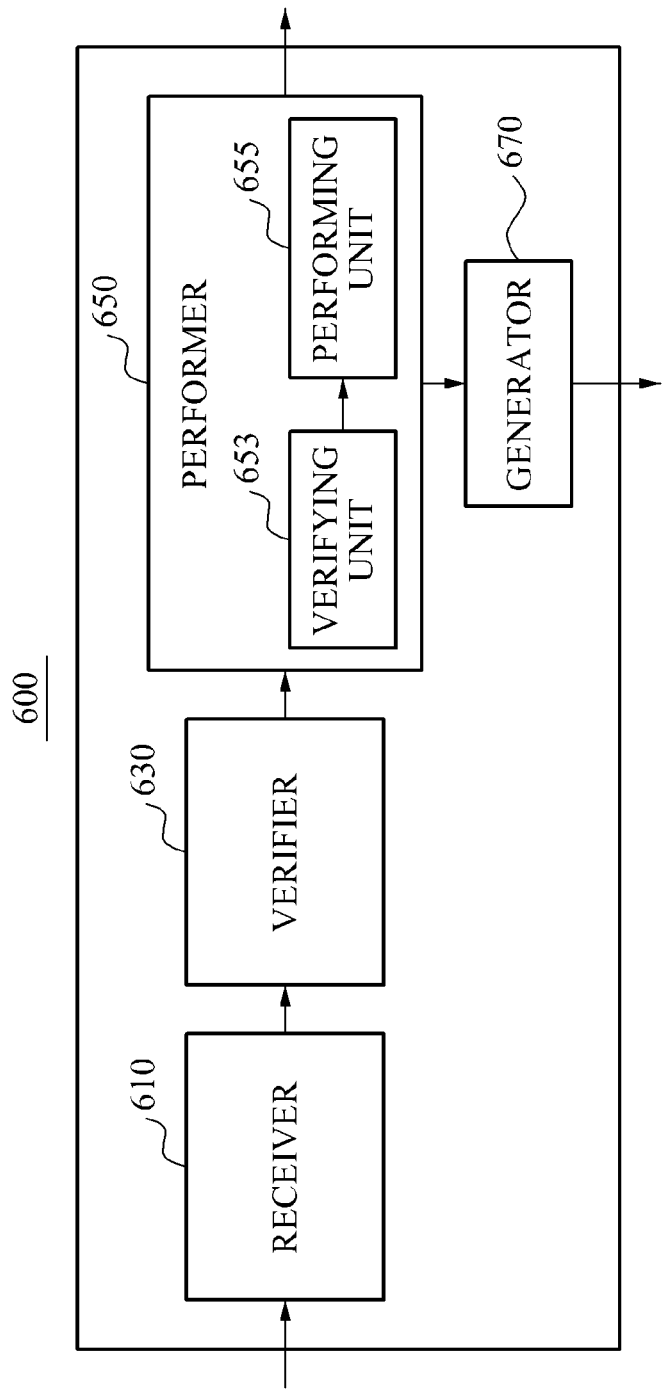
FIG. 6 is a block diagram illustrating an example of a reception node in a CCN.

FIG. 6 illustrates an example of a reception node 600 in a CCN.

The reception node 600 may include a receiver 610, a verifier 630, a performer 650, and a generator 670.

The receiver 610 may receive a content request packet including an OID that designates at least one control operation to be performed by at least one reception node included in the CCN. In addition to the OID, the content request packet may further include a content name requested by a transmission node included in the CCN.

The OID may designate at least one operation, for example, storing content, deleting content, copying content, updating content, forwarding content, dividing content, merging content, encoding content, decoding content, changing a content name, encrypting content, and the like.

The verifier 630 may verify the at least one control operation corresponding to the OID.

The performer 650 may perform the at least one control operation corresponding to the OID, and may include a verifying unit 653 and a performing unit 655.

The verifying unit 653 may verify whether the reception node includes a content according to a content name included in the content request packet.

Here, as an example, the content may correspond to a content requested by the transmission node included in the CCN. Further, the content may be an object for performing the at least one control operation.

The performing unit 655 may perform the at least one control operation for the content requested by the transmission node based on the verification of whether the content is included in the reception node.

The generator 670 may generate a content delivery packet including an OID that designates at least one control operation to be performed by at least one transmission node included in the CCN.

Here, the OID may designate at least one operation, for example, storing content, deleting content, copying content, updating content, forwarding content, dividing content, merging content, encoding content, decoding content, changing a content name, encrypting content, and the like.

When an OID (or an OID field including the OID) is added to a header of the content request packet, content stored in each node in the CCN may be controlled by transmitting the content request packet.

Further, by adding an OID (or an OID field including the OID) to a header of the content delivery packet, content stored in each node in the CCN may be controlled.

The units described herein may be implemented using hardware components and software components. For example, a defining unit, field adding unit, verifying unit, performing unit, generator, and the like. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a transmission node in a content centric network (CCN), the method comprising:

generating a content request packet including an operation identifier (OID) that designates a control operation to be performed by a reception node with respect to content stored in the reception node included in the CCN, wherein the generating comprises adding an OID field including the OID to a header of the content request packet; and transmitting the content request packet to the reception node based on the content name, wherein the content name stored in the header of the content request packet is searched by comparing the content name with contents in the reception node in order to determine whether the reception node contains a content corresponding to the content request packet, and wherein, based on whether the reception node contains the content, the control operation corresponding to the OID of the content request packet is performed on the content by the reception node, the control operation being one of modifying or copying the content, or changing the content name corresponding to the content request packet.

2. The method of claim 1, further comprising:
defining the OID to correspond to the at least one control operation to be performed by the at least one reception node receiving the content request packet.

3. The method of claim 2, wherein the defining comprises:
defining the OID corresponding to each of the at least one control operation to be performed with respect to content stored in the at least one reception node receiving the content request packet.

4. The method of claim 1, wherein the OID designates at least one operation selected from the group of storing content, deleting content, copying content, updating content, forwarding content, dividing content, merging content, encoding content, decoding content, encrypting content, and any combination thereof.

5. The communication method of claim 1, further comprising comparing a version of the content stored in a storage of a reception node with a second version of the content requested to be updated, and storing the content corresponding to an updated version of the content in response to the control operation of the OID being an instruction to update the content.

6. The communication method of claim 1, further comprising constructing a routing table at each of the at least one reception node, and
sending the content request packet to another of the at least one reception node using the content name in the header of the content request packet in response to determining that the reception node does not contain the content corresponding to the content name in the header of the content request packet.

7. A communication method of a reception node in a content centric network (CCN), the method comprising:
receiving a content request packet including an operation identifier (OID) that designates a control operation to be performed by a reception node with respect to content stored in the reception node included in the CCN, wherein a header of the content request packet comprises a OID field including the OID;
searching a storage of the reception node by comparing a content name stored in the header of the content request packet with contents in the reception node in order to determine whether the reception node contains a content corresponding to the content request packet;
verifying the control operation corresponding to the OID; and
performing the control operation that modifies or copies the content, or to change the content name corresponding to the content request packet.

8. The method of claim 7, wherein:
the content request packet further includes a name of a content requested by a transmission node included in the CCN, and
the performing the at least one control operation comprises:
determining whether the reception node includes the content, according to the name of the content; and
performing the at least one control operation for the content based on whether the content is included in the reception node.

9. The method of claim 7, further comprising:
generating a content delivery packet including an OID that designates at least one control operation to be performed by at least one transmission node included in the CCN.

10. The method of claim 7, wherein the OID designates at least one operation selected from the group of storing content, deleting content, copying content, updating content, forwarding content, dividing content, merging content, encoding content, decoding content, changing a content name, encrypting content, and any combination thereof.

11. A non-transitory computer-readable medium comprising a program for instructing a computer to perform the method of claim 7.

12. A transmission node in a content centric network (CCN), the transmission node comprising:
a generator configured to generate a content request packet including an operation identifier (OID) that designates a control operation to be performed by the reception node with respect to content stored in the reception node included in the CCN, wherein the generator comprises a field adding unit configured to add an OID field including the OID to a header of the content request packet; and
a transmitter configured to transmit the content request packet to the reception node based on the content name, wherein the content name stored in the header of the content request packet is searched by comparing the content name with contents in the reception node in order to determine whether the reception node contains a content corresponding to the content request packet, and
wherein, based on whether the reception node contains the content, the control operation corresponding to the OID of the content request packet is performed on the content by the reception node, the control operation being one of modifying or copying the content, or changing a content name corresponding to the content request packet.

13. The transmission node of claim 12, further comprising:
a defining unit configured to define the OID to correspond to the at least one control operation to be performed by the at least one reception node receiving the content request packet.

14. The transmission node of claim 13, wherein the defining unit defines the OID corresponding to each of the at least one control operation to be performed with respect to content stored in the at least one reception node receiving the content request packet.

15. The transmission node of claim 12, wherein the OID designates at least one operation selected from the group of storing content, deleting content, copying content, updating content, forwarding content, dividing content, merging content, encoding content, decoding content, encrypting content, and any combination thereof.

16. A reception node in a content centric network (CCN), the reception node comprising:
a receiver configured to:
receive a content request packet including an operation identifier (OID) that designates a control operation to be performed by reception node with respect to content stored in the reception node included in the CCN, wherein a header of the content request packet comprises a OID field including the OID, and
search a storage of the reception node by comparing a content name stored in the header of the content request packet with contents in the reception node in order to determine whether the reception node contains a content corresponding to the content request packet;

a verifier configured to verify the at least one control operation corresponding to the OID; and a performing unit configured to modify or copy the content, or to change the content name corresponding to the content request packet, based on the verified control operation.

17. The reception node of claim 16, wherein:

the content request packet further includes a name of a content requested by a transmission node included in the CCN, and the performing unit comprises:

a determining unit configured to verify whether the reception node includes the content, according to the name of the content; and a performing unit configured to perform the at least one control operation for the content based on whether the content is included in the reception node.

18. The reception node of claim 16, further comprising:

a generator configured to generate a content delivery packet including an OID that designates at least one control operation to be performed by at least one transmission node included in the CCN.

19. The reception node of claim 16, wherein the OID designates at least one operation selected from the group of storing content, deleting content, copying content, updating content, forwarding content, dividing content, merging content, encoding content, decoding content, changing a content name, encrypting content, and any combination thereof.

* * * * *